United States Patent [19]

Cummings et al.

[11] 4,278,285
[45] Jul. 14, 1981

[54] POCKETS FOR A FAIRING STRUCTURE

[75] Inventors: Kenneth W. Cummings, San Luis Obispo; Charles M. Perethian, Arroyo Grande, both of Calif.

[73] Assignee: First Champaign Corporation, Rantoul, Ill.

[21] Appl. No.: 95,409

[22] Filed: Nov. 19, 1979

[51] Int. Cl.³ .............................................. B62J 17/00
[52] U.S. Cl. ................................ 296/78.1; 280/289 S
[58] Field of Search ............................ 296/78.1, 15; 280/289 S

[56] References Cited

U.S. PATENT DOCUMENTS

| | | | |
|---|---|---|---|
| 3,154,342 | 10/1964 | Mueller | 296/78.1 |
| 4,019,774 | 4/1977 | Tsukahara | 296/78.1 |
| 4,066,291 | 1/1978 | Hickman | 296/78.1 |
| 4,089,556 | 5/1978 | Stobar | 296/78.1 |
| 4,135,758 | 1/1979 | Clements | 296/78.1 |
| 4,168,097 | 9/1979 | Doll | 296/78.1 |
| 4,178,033 | 12/1979 | Muth | 296/78.1 |

Primary Examiner—Robert R. Song
Attorney, Agent, or Firm—Wegner, Stellman, McCord, Wood & Dalton

[57] ABSTRACT

A faired enclosure or fairing for protecting occupants on a motorcycle is provided and includes an outer streamlined shell (10) and two inner pockets (14, 16). The inner pockets (14, 16) provide convenient storage space (28) and structural support for the outer shell (10) and are shaped to permit them to be easily formed by existing vacuum-forming or molding techniques. Structural support and ease of manufacture are obtained by shaping the inner pockets (14, 16) so as to provide large bonding surfaces (18, 20) between the outer shell (10) and the inner pockets (14, 16) while eliminating undercut areas which would interfere with mold separation.

8 Claims, 2 Drawing Figures

U.S. Patent    Jul. 14, 1981    4,278,285
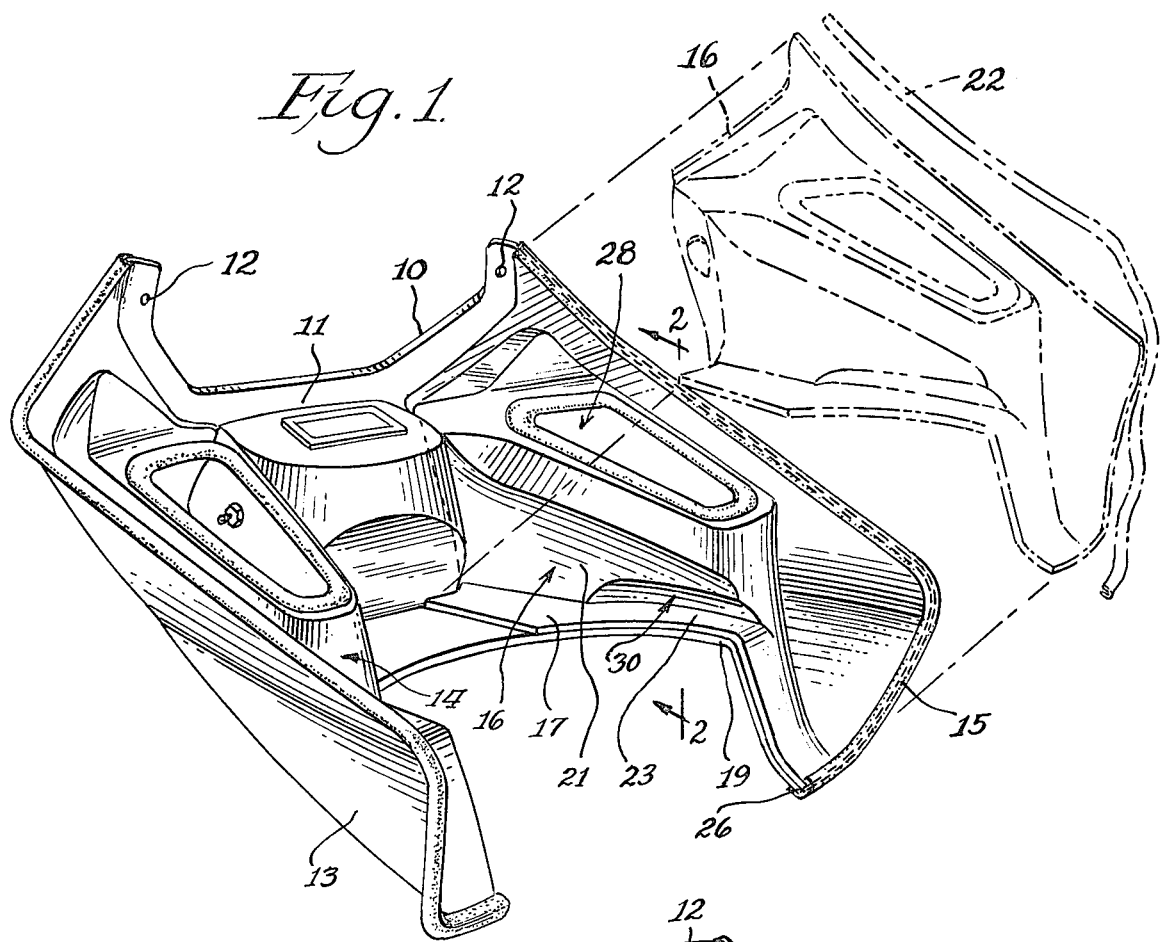
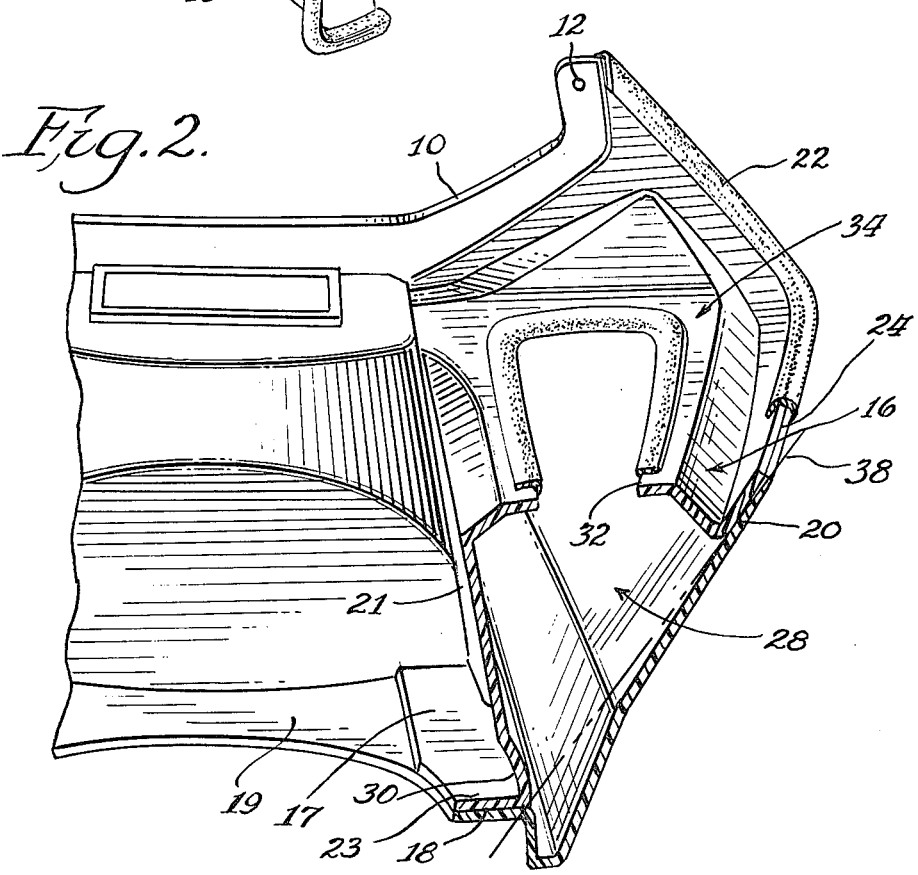

POCKETS FOR A FAIRING STRUCTURE

DESCRIPTION

1. Technical Field

This invention pertains to a protective enclosure or fairing for a motorcycle and, more particularly, to a motorcycle fairing which provides protection from the wind and elements, protection to the rider in the event of an accident, and which is easily manufactured.

2. Background Art

Existing motorcycle fairings are designed for a variety of purposes and each has its particular advantages and deficiencies. One type is described in U.S. Pat. No. 3,154,342, which issued to Mueller on Oct. 27, 1964, which consists simply of a thin shell which is designed as a windbreak to reduce wind resistance by streamlining the motorcycle. This type of fairing performs its intended function very well and is easily formed since it consists simply of a single shell. Unfortunately, the single shell structure is relatively fragile and provides no rider protection in the event of an accident. Further, no storage space is provided by this type of design.

An improvement on this design is illustrated by U.S. Pat. No. 4,019,774 which issued to Tsukahara et al on Apr. 26, 1977. This fairing retains the advantages of a streamlined shape and additionally provides flanges to which separate storage compartments may be attached. While the storage compartments provide an added convenience for the rider, they do not materially increase rigidity or strength since they do not become an integral part of the fairing structure. In addition, this design is relatively expensive since the walls of the fairing itself are not used as part of the storage compartment and hardware must be provided to attach the compartments to the fairing shell.

Further improvements in fairing construction have resulted in a fairing which includes an outer and an inner shell which simultaneously provides a rigid box-shaped structure surrounding the rider and storage space between the two shells. A fairing of this type is illustrated by U.S. Pat. No. 4,066,291 which issued to Hickman on Jan. 3, 1978.

While this type of fairing includes many features which are desirable from the rider's point of view, it is difficult and expensive to manufacture since the single separate inner shell must take on an extremely complicated shape in order to conform to the outer shell. A single inner shell construction requires recurved or undercut portions which necessitate complicated and expensive molding techniques. Forming the fairing as a single structure does not materially reduce costs since extensive mold coring is required to reduce weight and form the storage compartments.

It is desirable to provide a fairing which retains the advantages found in the existing constructions noted above while eliminating the deficiencies and reducing manufacturing costs. Specifically, the advantages to be retained are a streamlined outer shell shape, a rigid and structurally strong construction, storage space within the fairing and a construction which may be easily manufactured.

DISCLOSURE OF INVENTION

The invention disclosed and claimed herein is directed to a fairing for a motorcycle which streamlines the motorcycle and provides protection to the rider from the wind and the elements. In addition, the fairing is structurally strong and rigid to protect the rider in the event of accident and includes convenient storage compartments. Finally, these features are provided by a fairing which may be economically manufactured.

The invention includes a generally concave outer shell, open to the rear, which is attached to the forward portion of the motorcycle frame. Convex inner pockets are bonded to either side of the outer shell to form integral, hollow support structures extending along either side of the rider. The support structure formed is generally tubular or rectangular in cross section thus greatly increasing the structural rigidity and strength of the outer shell. The upper portion of the inner shells includes an opening which provides access to the interior of the hollow structure formed between the inner and outer shells, thus producing storage compartments which may be used by the motorcycle rider. The inner shells are shaped to eliminate any recurved or undercut portions which would necessitate complicated manufacturing techniques such as three-piece molds or internal cores.

BRIEF DESCRIPTION OF DRAWINGS

FIG. 1 is a perspective illustration of the assembled motorcycle fairing including a broken line illustration of the inner shell;

FIG. 2 is a partial sectional elevation taken along lines 2—2 of FIG. 1 illustrating the bonding surfaces and compartment formed between the inner and outer fairing shells.

BEST MODE FOR CARRYING OUT THE INVENTION

Referring to the drawings, there is shown in FIG. 1 the completed motorcycle fairing of the present invention, comprising an outer shell 10 adapted to be mounted to the front portion of a motorcycle frame (not shown). The outer shell 10 is molded in a single piece of thermosetting plastic, which may be acrylonitrile butadiene-styrene (ABS), and is generally concave in shape having sides and a bottom which taper outwardly and rearwardly in such a manner as to direct wind, and the like, around the motorcycle and its occupants. The forward portion 11 of the outer shell 10 includes mounting holes 12 to which may be attached a windshield to further protect the motorcycle occupants. The fairing outer shell 10 is attached to the motorcycle in any appropriate manner, the attaching means forming no part of the present invention.

Located within and attached to the rearwardly directed sides 13 and 15 of the outer shell 10 are two inner pockets 14 and 16, one of which is indicated by broken lines in an exploded portion of FIG. 1. The inner pockets 14, 16 form mirror images of each other and are identically attached to the outer shell 10. For this reason, only one of the inner pockets is illustrated in FIGS. 1 and 2.

The fairing is assembled by bonding the inner pocket 16 to the outer shell 10 along common contact surfaces 18 and 20 and applying a U-shaped cover strip 22 to the assembly edge 24 and the trailing edge 26 of the outer shell 10. The inner pocket 16 is generally convex in cross section and, when combined with the generally concave outer shell, produces a cavity 28 which tapers from front to back.

Since the cavity 28 has a relatively large cross-sectional shape, its bending moment of inertia will be relatively large thus affording high resistance to bending so long as the inner pocket 16 and the outer shell 10 are constrained to act as a single structure, i.e. the two pieces must not move relative to each other. To prevent such relative movement, the inner pocket 16 is formed with a flange 17 to provide a large bonding surface completely around the perimeter of the inner pocket 16. It is desirable to make the cavity 28 of the inner pocket 16 of a maximum size so as to increase the storage capability of the pocket. This is accomplished by having the wall 21 of the pocket 16 substantially vertical or inwardly sloping and spaced, when installed, a maximum distance from the side 15 of the fairing. However, with the wall 21 spaced a maximum distance from the side 15, the wall 21 will substantially align with the cutout 19 in the shell 10 of the fairing and will have little or no flange area at its base to attach to the shell of the fairing. To overcome this deficiency, the lower portion of the inner pocket 16 is provided with an indentation 30 which extends what would otherwise be a narrow, ineffective area into a substantial flange 23 which has a large bonding surface 18 with the outer shell 10, shown in FIG. 2.

The indentation 30 provides a rib in the side wall of the pocket which adds strength thereto. The bottom wall or flange 23 of the indentation 30 extends out to the edge of the pocket thereby providing the broader surface 18 for bonding to the outer shell 10. The broad extra thickness provided by the flange 23 and bottom wall of the outer shell 10 strengthens the fairing particularly where the fairing is attached or mounted to the motorcycle frame.

By providing an inner pocket 16 in the particular shape illustrated, a number of advantages are obtained. First, the strength of the upper edge 24 of the outer shell 10 is enhanced since the addition of the inner pocket 16 produces two thicknesses of material in this location. Second, addition of the inner pocket 16 produces a cavity 28 having a large cross section which greatly increases the moment of inertia of the portion of the fairing alongside the rider. This greatly increases the resistance of the fairing to bending and helps protect the rider in the event of accident. Third, as explained above, the base or flange 23 of the indentation 30 provides a large bonding surface 18 which is resistant to loosening caused by flexure during use. Fourth, by providing an aperature 32 in the top surface 34, access is provided to the cavity 28 located between the inner pocket 16 and the outer shell 10. This cavity 28 may then be used for storage.

The inner pockets 14,16 are also shaped to permit economical manufacture. If the inner pockets 14,16 were manufactured as a single unit, the inwardly sloping sides 21 and the indentations 30 would produce recurved or undercut sections which would necessitate the use of cores during the molding process or complicated three-piece molds. By producing the inner pockets 14,16 as separate pieces in the same mold, however, the parting line of the mold can be arranged as shown generally by the line 38 in FIG. 2. By arranging the mold part line as indicated, undercut surfaces are eliminated thereby allowing relatively simple two-piece molds to be utilized. The shape of the inner pockets 14,16 even allows both sides to be molded or vacuum-formed as a single piece, but in a side-to-side fashion rather than the undesirable configuration noted above with respect to existing shapes. In the mold, the pockets 14,16 are joined along what will later become the upper edge 24 rather than the lower surface 18. Thus, the shape of the pockets 14,16 allows a single part to be molded or vacuum-formed which, when cut down the center, will produce both pockets without introducing molding complications.

Thus, it will be seen that the particular shape of the fairing inner pockets 14 and 16 contributes greatly to the structural strength of the fairing, provides a convenient storage space for the rider, and greatly simplifies the manufacturing process.

Other aspects, objects and advantages of this invention can be obtained from a study of the drawings, the disclosure and the appended claims.

We claim:

1. An improved internal pocket and support structure for a motorcycle fairing of the type having a generally concave, hollow, rearwardly opening configuration including sides which partially enclose the rider and a horizontal bottom adapted to be attached to the front portion of a motorcycle forward of the rider's position, the improved pocket structure comprising:
    two independent, generally convex inner pockets, each pocket being attached around its periphery to overlapping portions of one of said sides and said bottom of said fairing thereby forming a cavity between said one concave fairing side and said convex pocket;
    each said pocket being shaped such that all portions of said pocket form an angle of less than ninety degrees to a selected plane containing that portion of the periphery attached to said side.

2. The improved internal pocket of claim 1 wherein said periphery of each pocket includes enlarged surfaces adjacent to and matching the shape of the overlapping portions of said sides and bottom of said fairing thereby providing a large mating area between said pocket and said fairing.

3. An improved internal pocket and support structure for a motorcycle fairing of the type having a generally concave, hollow, rearwardly opening configuration including sides which partially enclose the rider and a horizontal bottom adapted to be attached to the front portion of a motorcycle forward of the rider's position, the improved pocket structure comprising:
    two independent, generally convex inner pockets attached around their peripheries to the sides and bottom of said fairing thereby forming cavities between said concave fairing sides and said convex pockets;
    said peripheries of said pockets include enlarged surfaces adjacent to and matching the shape of the sides and bottom of said fairing thereby providing a large mating area between said fairing and said pocket; and
    a rib on each pocket curving toward the side of said fairing forming reliefs adjacent said fairing bottom thereby permitting the area of said enlarged surfaces matching said fairing bottom to be increased;
    said pockets being shaped such that the portions of all surfaces form an angle of less than ninety degrees to a selected plane.

4. The improved internal pocket of claim 3 wherein said inner pockets are symmetrical with respect to a plane passing through the center of said fairing and along the axis of said motorcycle.

5. A fairing structure comprising:
    an exterior generally concave shell adapted to be attached to a motorcycle forward of a rider and extending rearwardly on either side to partially enclose said rider;

oppositely curved, generally convex pockets located in and attached to each of said rearwardly extending sides;

said rearwardly extending sides and said pockets cooperating to form enclosed cavities on either side of said rider;

peripheral flanges around said pockets conforming to the inner surfaces of said rearwardly extending sides;

said pockets and peripheral flanges having surfaces which at all locations form acute angles to a selected plane containing the flanges that are attached to said rearwardly extending sides.

6. A fairing assembly adapted for mounting on a motorcycle comprising:

a single generally concave outer shell sloping outwardly and upwardly from a bottom wall mounted on said motorcycle, said outer shell including rearwardly extending sides partially enclosing a rider of said motorcycle;

two symmetrical generally convex pockets, one of which is located in each of said sides, each pocket including a generally horizontal surface extending to the upwardly extending portions of said shell, a generally inwardly facing vertical surface extending from the horizontal surface downwardly to the outwardly extending portion of said shell and a rearwardly facing vertical surface extending between the horizontal surface and the inwardly facing vertical surface;

said horizontal, vertical and inwardly and rearwardly facing surfaces cooperating with said shell to form internal cavities on either side of said rider; and a rib on each pocket curving toward the side of said fairing forming reliefs adjacent said fairing bottom thereby permitting the area of said enlarged surfaces matching said fairing bottom to be increased.

7. The fairing assembly of claim 6 wherein said horizontal and said inwardly facing and rearwardly facing vertical surfaces terminate in flanges conforming to the shape of said outer shell thereby forming large contact areas.

8. The fairing assembly of claim 7 wherein said horizontal, vertical and rear surfaces and said flanges form acute internal angles with a plane containing the junction of said flanges with said horizontal and vertical sides.

* * * * *